3 Sheets—Sheet 1.

A. RALSTON.

Grain Separator.

No. 342.

Reissued Jan'y 15, 1856.

3 Sheets—Sheet 2.

A. RALSTON.

Grain Separator.

No. 342.

Reissued Jan'y 15, 1856.

3 Sheets—Sheet 3.
A. RALSTON.
Grain Separator.
No. 342.
Reissued Jan'y 15, 1856.
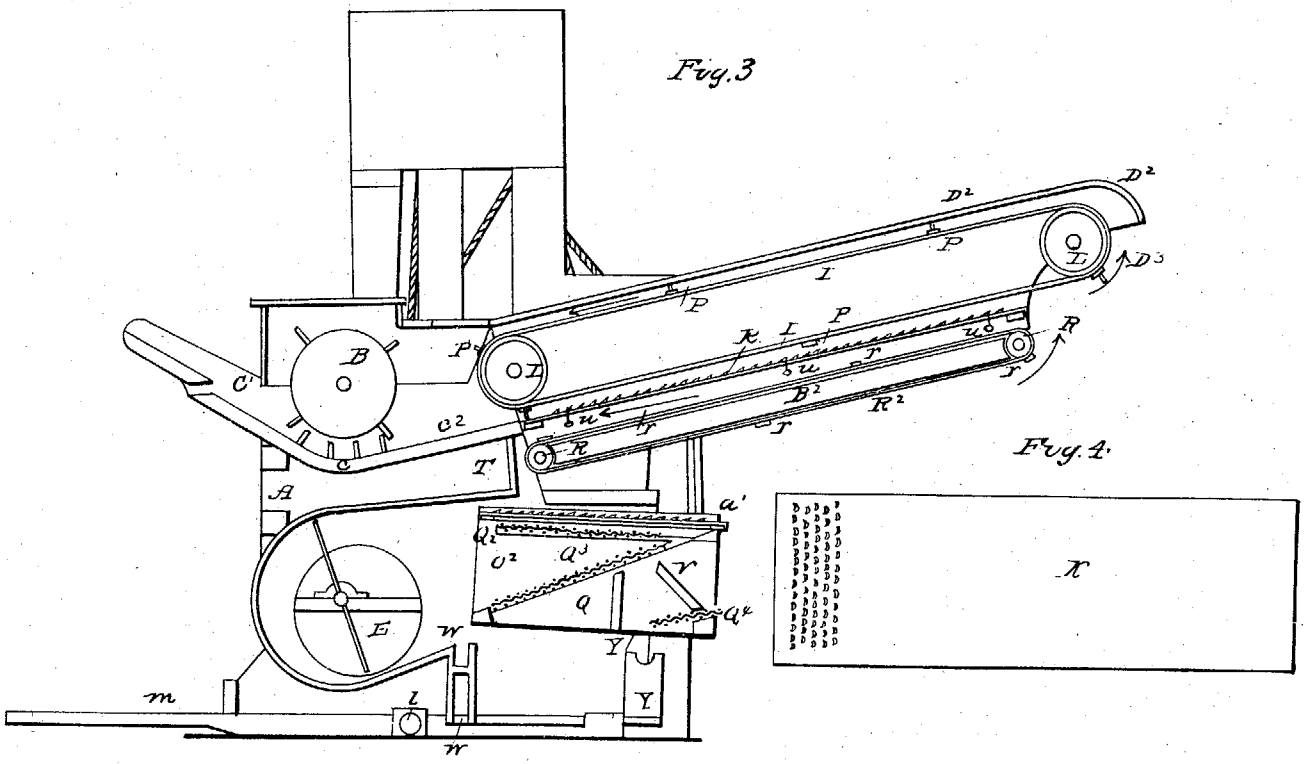

UNITED STATES PATENT OFFICE.

ANDREW RALSTON, OF MIDDLETOWN, PENNSYLVANIA.

IMPROVEMENT IN MACHINES FOR THRASHING AND WINNOWING GRAIN.

Specification forming part of Letters Patent No. 2,467, dated February 21, 1842; Reissue No. 342, dated January 15, 1856.

*To all whom it may concern:*

Be it known that I, ANDREW RALSTON, formerly of Hopewell, Pennsylvania, now of Middletown, in the county of Washington and State aforesaid, have invented certain new and useful Improvements in Machines for Thrashing and Winnowing Grain; and I do hereby declare the following to be a full, clear, and exact description of the same, reference being had to the accompanying drawings, in which—

Figure 1:
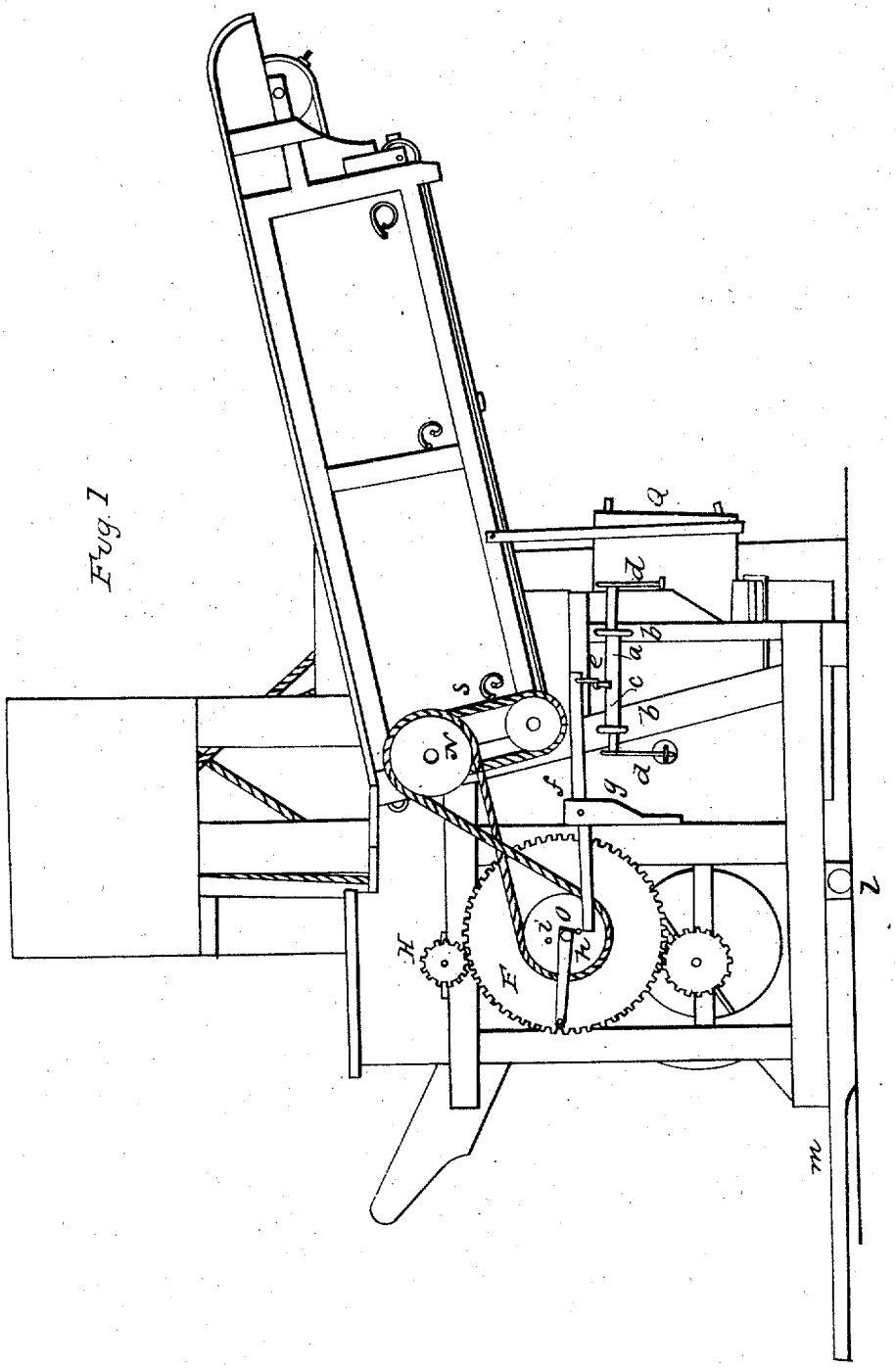
Figure 2:
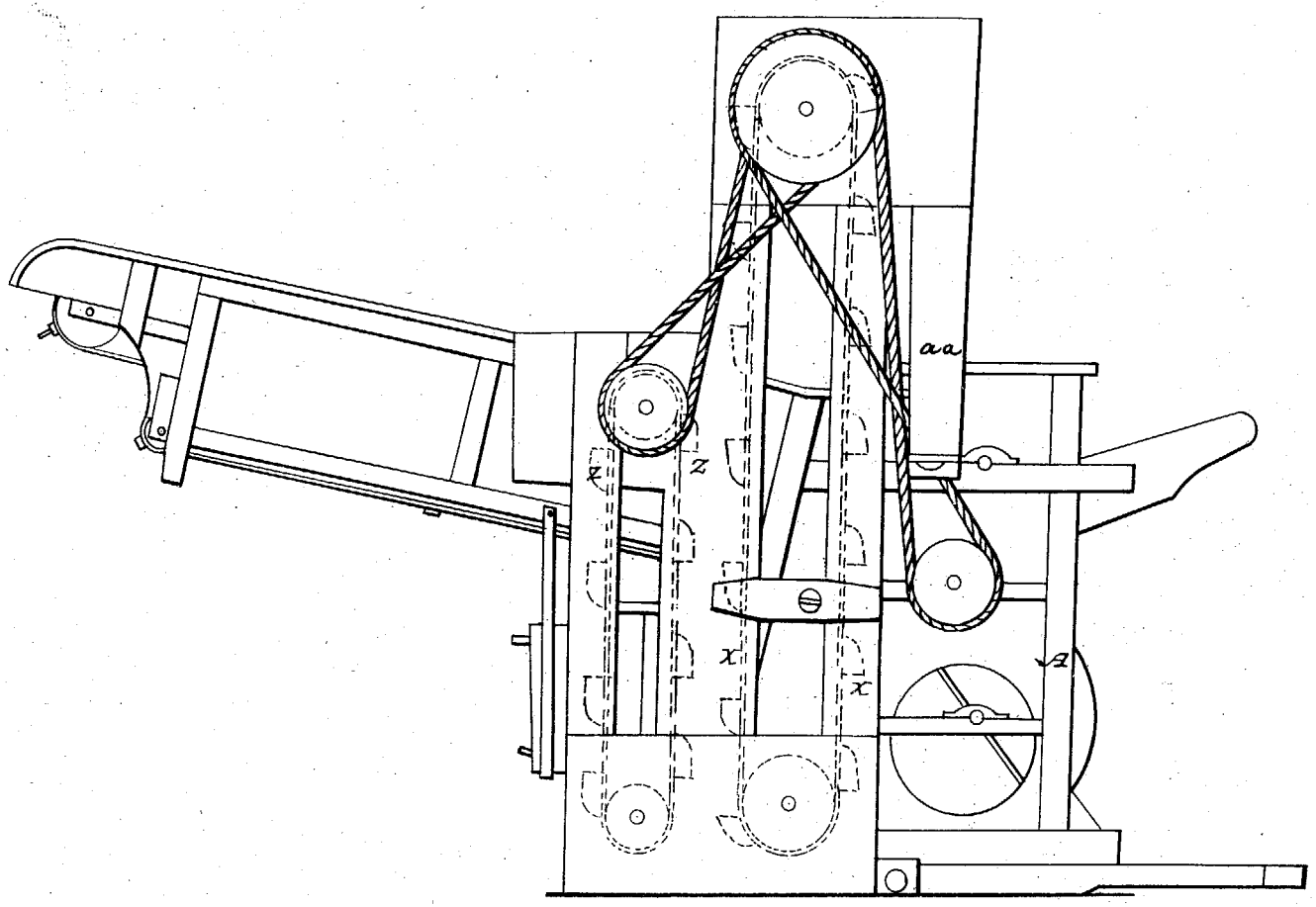

Figure 1 represents a side elevation. Fig. 2 represents also a side elevation showing the elevators by dotted lines. Fig. 3 is a vertical longitudinal section through the center of the machine, showing the internal arrangement of the several parts. Fig. 4 is a plan of the straw-screen, showing a few of the perforations therein.

Similar letters, where they occur in the several figures, denote like parts.

The nature of my invention relates, first, to the pecular construction of the chaff-screen, which consists of a thin plate of metal punched with a semicircular instrument, for the purpose of producing semicircular apertures, and at the same time leave the parts of the metal thus partly punched from said plate overhanging said apertures at an angle of thirty or forty degrees, or at any suitable angle greater than that of the plate, for the purpose of allowing the grain to pass through said apertures, and at the same time prevent the chaff and straw entering them, and thereby preventing choking; and, secondly, in combining with the system of screens and blower an elevator or elevators for conveying the cleaned grain to the granary or other place of deposit, as will be described hereinafter.

To enable others skilled in the art to make and use my invention, I will proceed to describe the same with reference to the drawings.

The frame A of the thrashing-machine, cylinder B, and concave C are made similar to others in use. The straw-conveyer D is likewise arranged, generally, in the manner of some others now in use, although its construction differs in several important items, as will be hereinafter described. It consists of two endless straps, I, passed around two parallel cylinders, L L, turning in the conveyer-frame D by means of a crossed band, M, passed around a pulley, N, on the end of one of the rollers L, and a pulley, O, on the face of the cog-wheel F. To these endless parallel straps are attached parallel transverse bars P, provided with teeth in the manner of a rake, for more effectually taking hold of the straw and carrying it from the thrashing-cylinder up over the inclined straw-screen K, and discharging it over the upper or rear end thereof. Over this conveyer is placed a cover, $D^2$, at such a distance therefrom that the teeth will nearly touch its under side as they pass along under it. The arrow indicates the direction the conveyer turns. The straps are prevented from slipping on the rollers by pins or cogs in their periphery entering corresponding perforations in the straps. The stationary inclined straw-screen K, for permitting the grain and chaff to pass through its perforations, while the straw is carried over it by the conveyer D, consists of an inclined metallic plate perforated with a number of oval apertures with an instrument adapted to take out about three-fourths of the metal from the aperture, leaving one-fourth therein, which is turned upward at a greater angle than that at which the screen is placed, forming a tongue for the purpose of allowing the straw to slide up over it freely, and at the same time to allow the grain to descend under it through said aperture. One aperture and one tongue only are described, but all the rest are made in the same manner. This screen extends from the lower part, $c^2$, of the concave $c$, which forms an inclined plane of an angle coincident with that of the screen K.

Below the straw-screen K and parallel therewith are arranged, around revolving rollers R R′, three other or less parallel straps or bands, $R^2$, having parallel transverse strips of wood $r$ attached to them, and thus constructed is called the "returner," and is for the purpose of returning the grain toward the lower end of the straw-screen K to the vibrating screens placed below said returner, being moved in the same direction as that of the conveyer, as indicated by the arrow, by means of a band, S, passed around the pulley N, and another pulley on the end of the roller R′. The grain is guarded from the action of the fan during its return-motion by a guard, T, placed in nearly a vertical position between the returner and fan. The grain, with the chaff, &c., is shoved by said returner down over an inclined board, $B^2$, placed between or below the returner R. Below the returner and next to it is arranged a chaff-screen, Q′. It is run into grooves in the shoe, which is constructed, suspended, and vibrated much in the manner of the ordinary fan-shoe. The said chaff-screen is made in the following manner: It consists of a thin plate of metal punched with a semicircular instrument, for the purpose of producing semicircular apertures and at the same time leave the parts of the metal thus partly punched from said plate overhanging said apertures at an angle of thirty or forty degrees, or at any suitable angle greater than that of the plate, for the purpose of allowing the grain to pass through said apertures and at the same time prevent the chaff and straw from entering them, and thereby preventing choking. Besides, by thus having these lips overhanging the apertures inclining upward in a direction from the fan the wind from the same passes more freely through the perforations and with an increased draft, which also promotes the separation of the grain from the dirt, &c., and thus effects a very valuable and important office in the machine. The position of this screen is a little above the axle of the fan and below the lower end of the returner. It is nearly the length and breadth of the shoe. Below the chaff-screen and at a short distance therefrom is arranged a fine screen, $Q^2$, which is the same width of the chaff-screen, but much shorter, and is also inserted in grooves in the shoe. An inclined screen, $Q^3$, is placed below said fine screen, leading back toward the fan to an inclined transverse spout, W, which conducts the grain to the elevators X. Near the bottom of the shoe (rear end) is arranged a short inclined screen, $Q^4$, of two kinds of meshes, the one fine and the other coarse, inclining in the same direction with the last-mentioned inclined screen and leading to another transverse inclined spout, Y, leading to a second set of elevators, *z*, the lower end of said last-mentioned screen being arranged perpendicularly under the upper end of the inclined screen $Q^3$, between which last-mentioned screens is placed an inclined board, V, for conducting the tail-grain or "tailings," as it is called, from its being only partly cleaned and requiring another operation. This screen is therefore called, for the sake of distinction, the "tail-screen." The main object effected by it is to catch or stop all the grain that may be thrown off with the dirt from the fine screen $Q^4$, and by means of different meshes to separate the dirt therefrom. The upper or fine meshes of the tail-screen will let the cheat, cockle, &c., pass through. The lower or coarse meshes, which are directly over the transverse inclined tail-spout Y, will let the wheat, with some small particles of dirt, pass through the said spout, while the rat-dung, heads, and larger particles of dirt will slide over the lower edge of the screen, from which spout the grain will be taken by the tail-elevators *z* to the returner by another spout for a second operation, which will clean it effectually by the operation of the machine itself without the necessity of an attendant at the tail end, except, occasionally, to remove the chaff. The tail-screen is made flexible for the purpose of adjustment, in order to arrest more or less of the tailings thrown over the end of the screen. The elevators X and Z are made like those used in flouring-mills, and are arranged on the opposite side of the frame from that containing the gearing. One is called the "grain-elevator," and the other is called the "tail-elevator." They are turned by bands and pulleys. The elevators X are for elevating the clean grain to the granary or other place, or to the bags to be filled, to which the grain is conducted by the spout A. The elevators Z are for elevating the tail-grain to a short side spout which conducts it back to the returner and screens for a second operation. The trunks of the elevators are secured to the frame by screws or T-bolts or otherwise, so that they may be removed or adjusted at pleasure.

The manner of shaking the screens equally at both ends, instead of principally at one end, as heretofore, is produced by the following arrangement of parts. Two boxes, ears, or eyes, *b*, are fixed in the side of the main frame, in which are placed the gudgeons or reduced ends of a horizontal axle, *c*, to which are fixed two vertical arms, *d*, to whose ends are attached chains which connect them to the sides of the shoe Q. From the periphery of the axle *c* there projects a horizontal arm, *a*, to whose outer extremity is attached a vertical connecting-rod, *x*, which is also connected to the end of a horizontal lever, *f*, whose fulcrum *g*, which is near the center, is inserted horizontally into the side of the frame, which lever is acted upon by cams or pins *h i*, projecting from the side of the pulley on the main cog-wheel F, so as to depress one end of the lever and at the same time elevate the other, which gives the vibrating movement to the shoe containing the screens. The fan E for separating the chaff and dirt, &c., from the grain is made like the common wheat-fan, and is placed in the frame A, below the concave *e* of the thrashing-machine. It is turned by a cog-wheel, F, meshing into a pinion, G, on the axle of the fan, which cog-wheel F also turns the thrashing-cylinder B, by meshing into a pinion, H, on its axle. The frame of the machine is placed upon an axle, *l*, on which are put wheels for the purpose of moving it from place to place, as desired, connected to a forward pair of wheels by hounds *m*, of the usual or any other form, and to which the horse-power used for propelling the machine may also be connected. When the machine is to be used, the axle must be brought down upon the ground in the manner represented in the drawings by removing the wheels. In replacing the wheels the hounds and axle are lifted, while the rear sill of the frame rests on the ground, until the axle be raised sufficiently high to allow the wheels to be put on, which can be effected by one man.

Operation: The grain to be thrashed and cleaned is put into the hopper $c'$, and by the teeth of the cylinder B it is struck and brought against the teeth of the concave $c$, which separates the grain from the straw. The conveyer D conveys the whole up over the stationary screen K. The grain and part of the chaff fall through the apertures in said screen upon the inclined board $B^2$ of the returner $R^2$. The straw is thrown off by the rakes of the conveyer at the rear end at $D^3$. The returner $R^2$ shoves the grain and chaff back toward the thrashing-cylinder down over said inclined board $B^2$, and discharges it over the lower end upon the chaff-screen $Q'$, through which the grain falls to the screens below, while the chaff is shaken by the shoe Q and blown off at the near end by the fan E. The grain falls into the spout W, which conducts it to the elevators X, which elevate it to the granary or bagging-spout $a$ $a$. The tailings are caught upon the screen $Q^4$, from which the grain descends to the spout Y, which conducts them to the tailing-elevators Z, which elevate them to a short inclined cross-spout, into which they are emptied and conducted to the screens to undergo a second operation.

Having thus fully described the nature of my invention, what I claim therein as new, and desire to secure by Letters Patent, is—

1. The peculiar construction of the chaff-screen $Q'$, which consists of a thin plate of metal punched with a semicircular instrument for the purpose of producing semicircular apertures, and at the same time leave the parts of the metal thus partly punched from said plate overhanging said apertures at an angle of thirty or forty degrees, or at any suitable angle greater than that of the plate, for the purpose of allowing the grain to pass through said apertures, and at the same time prevent the chaff and straw entering them and thereby preventing choking.

2. The combination of the system of screens, the blower, and the elevators X, for cleaning and conveying the cleaned grain to the granary or other place of deposit, substantially as herein set forth and represented.

ANDREW RALSTON.

Witnesses:

PATRICK O'CONNOR,
FRANCIS HARRIS.